US012484680B2

(12) United States Patent
Yu et al.

(10) Patent No.: US 12,484,680 B2
(45) Date of Patent: Dec. 2, 2025

(54) NAIL CLIPPER DEVICE

(71) Applicant: Chang Gung University of Science and Technology, Taoyuan (TW)

(72) Inventors: I-Chen Yu, Taoyuan (TW); Yu-Ruei Chen, Taoyuan (TW)

( * ) Notice: Subject to any disclaimer, the term of this patent is extended or adjusted under 35 U.S.C. 154(b) by 135 days.

(21) Appl. No.: 18/442,029

(22) Filed: Feb. 14, 2024

(65) Prior Publication Data

US 2024/0282184 A1 Aug. 22, 2024

(30) Foreign Application Priority Data

Feb. 21, 2023 (TW) ................................ 112106329

(51) Int. Cl.
*A45D 29/02* (2006.01)
*G08B 21/02* (2006.01)

(52) U.S. Cl.
CPC ............. *A45D 29/02* (2013.01); *G08B 21/02* (2013.01)

(58) Field of Classification Search
CPC .................. A45D 29/02; A45D 29/023; A45D 2029/026; A01K 13/00; A01K 17/00
USPC ..... 30/28; D28/60; 132/73, 73.5, 75.4, 75.5, 132/288; 362/119, 120
See application file for complete search history.

(56) References Cited

U.S. PATENT DOCUMENTS 2,887,773 A * 5/1959 Killen .................. A45D 29/023 30/28
D309,038 S * 7/1990 Ladora ........................... D28/60
6,220,251 B1 * 4/2001 Jeong ..................... A45D 29/04 30/28
7,000,321 B1 * 2/2006 Rodgers ................. A01K 13/00 132/75.5
7,131,448 B2 * 11/2006 Lund ...................... A45D 29/02 132/73.5
7,137,356 B2 * 11/2006 Huggans ................ A01K 13/00 132/73.5
7,217,001 B2 * 5/2007 Vrsalovic ............... A45D 29/02 362/119

(Continued)

FOREIGN PATENT DOCUMENTS

CN 2678441 Y * 2/2005 ............. A45D 29/02
CN 207461652 U * 6/2018 ............. A45D 29/02

(Continued)

*Primary Examiner* — Jason Daniel Prone
(74) *Attorney, Agent, or Firm* — Bruce Stone LLP; Joseph A. Bruce

(57) ABSTRACT

A nail clipper device including a lever, a lever cover, a main body, a first circuit board, a second circuit board, a connection assembly, and a nail cutter shell is provided. The lever cover is fitted over the lever, and the main body is connected to the lever, including a nail cutter. The first circuit board includes signal amplification circuit, alarm light module, and nail cutter electrode. The alarm light module is electrically connected to the signal amplification circuit, and the nail cutter electrode is electrically connected to the nail cutter. The second circuit board includes a finger electrode electrically connected to the signal amplification circuit. The connection assembly electrically connects the first and second circuit boards. The nail cutter shell features a finger reserved hole, positioned corresponding to the finger electrode. The nail clipper device is capable of preventing accidental injuries to the nail flesh during nail clipping.

5 Claims, 5 Drawing Sheets

(56) References Cited

U.S. PATENT DOCUMENTS

| | | | | |
|---|---|---|---|---|
| 7,263,775 | B2 * | 9/2007 | Moulton, III | A45D 29/02 362/119 |
| D562,499 | S * | 2/2008 | Park | D28/60 |
| D584,453 | S * | 1/2009 | Rollo | D28/60 |
| 7,575,335 | B2 * | 8/2009 | Neal | A45D 29/02 362/119 |
| 7,954,242 | B1 * | 6/2011 | Brizan | A45D 29/02 30/28 |
| 8,096,305 | B1 * | 1/2012 | Cheney | A45D 29/02 132/73.5 |
| 8,100,088 | B2 * | 1/2012 | Manheimer, III | A01K 13/00 119/610 |
| 9,913,522 | B1 * | 3/2018 | Greenstone | A45D 29/02 |
| 10,076,173 | B1 * | 9/2018 | Kaidi | A45D 29/02 |
| 12,256,823 | B1 * | 3/2025 | Dimick | A45D 29/02 |
| 12,274,343 | B2 * | 4/2025 | Tarakçi | A45D 29/02 |
| 2004/0123875 | A1 * | 7/2004 | Kim | A45D 29/02 132/73.5 |
| 2007/0028936 | A1 * | 2/2007 | Kriser | A45D 29/023 132/75.8 |
| 2007/0137041 | A1 * | 6/2007 | Manheimer | A01K 13/00 30/29 |
| 2008/0000088 | A1 * | 1/2008 | Casillas | A45D 29/02 30/28 |
| 2009/0229622 | A1 * | 9/2009 | Malin | A45D 29/02 30/28 |
| 2022/0117370 | A1 * | 4/2022 | Barnes | A45D 29/02 |
| 2022/0408897 | A1 * | 12/2022 | Barnes | A45D 29/02 |
| 2025/0160499 | A1 * | 5/2025 | Ma | A45D 29/02 |

FOREIGN PATENT DOCUMENTS

| | | | | | |
|---|---|---|---|---|---|
| CN | 217013064 | U | * | 7/2022 | A45D 29/02 |
| CN | 217547444 | U | * | 10/2022 | A45D 29/02 |
| CN | 222284902 | U | * | 1/2025 | A45D 29/02 |
| KR | 20150002646 | U | * | 7/2015 | A45D 29/02 |
| KR | 20170124918 | A | * | 11/2017 | A45D 29/02 |
| KR | 20210147456 | A | * | 12/2021 | A45D 29/02 |
| TW | M367631 | U | * | 11/2009 | A45D 29/02 |
| TW | 1832712 | B | * | 2/2024 | A45D 29/02 |
| TW | 202423341 | A | * | 6/2024 | A45D 29/02 |
| WO | WO-2007111580 | A1 | * | 10/2007 | A45D 29/02 |

* cited by examiner

NAIL CLIPPER DEVICE

FIELD OF THE DISCLOSURE

The present disclosure relates to a nail clipper device, particularly a nail clipper device equipped with an alarm light module.

BACKGROUND OF THE INVENTION

Patients with diabetes suffer from poor blood circulation, leading to wounds that are difficult to heal. These wounds, if infected due to tissue necrosis, may require amputation of parts of the hands or feet. Therefore, hand and foot care are critically important for diabetic patients, especially to prevent accidental injuries to the nail flesh while trimming nails.

As such, finding a way to avoid accidental injuries to the nail flesh during nail clipping is a matter worthy of consideration for those skilled in the art.

SUMMARY OF THE INVENTION

The objective of this invention is to provide a nail clipper device capable of preventing accidental injuries to the nail flesh during nail clipping.

The nail clipper device of this invention comprises a lever, a lever cover, a main body, a first circuit board, a second circuit board, a connection assembly, and a nail cutter shell. The lever cover is fitted over the lever, and the main body, which is connected to the lever, includes a nail cutter. Additionally, the first circuit board is positioned above the rear of the main body and includes a signal amplification circuit, an alarm light module, and a nail cutter electrode. The alarm light module is electrically connected to the signal amplification circuit, and the nail cutter electrode is electrically connected to the nail cutter. Moreover, the second circuit board is positioned below the rear of the main body and comprises a finger electrode, which is electrically connected to the signal amplification circuit. The connection assembly electrically connects the first and second circuit boards. Furthermore, the nail cutter shell is fitted over the main body and features a finger reserved hole, positioned to correspond with the finger electrode.

In the aforementioned nail clipper device, the first circuit board also includes a power supply module, with one of its electrodes connected to the nail cutter electrode, and the other electrode connected to the finger electrode.

In the aforementioned nail clipper device, the connection assembly comprises a screw and a nut, where the nut corresponds to the screw. Both the screw and the nut are made from a conductive material.

In the aforementioned nail clipper device, the alarm light module is a light-emitting diode (LED).

In the aforementioned nail clipper device, the power supply module is a lithium battery, an alkaline battery, or a silver oxide battery.

This invention has the following advantage: it prevents accidental injuries to the nail flesh while trimming nails.

The foregoing, as well as additional objects, features and advantages of the invention will be more readily apparent from the following detailed description, which proceeds with reference to the accompanying drawings.

BRIEF DESCRIPTION OF THE DRAWINGS

The objects, spirits, and advantages of the preferred embodiments of the present disclosure will be readily understood by the accompanying drawings and detailed descriptions, wherein.

DESCRIPTION OF THE PREFERRED EMBODIMENTS

Figure 1A:
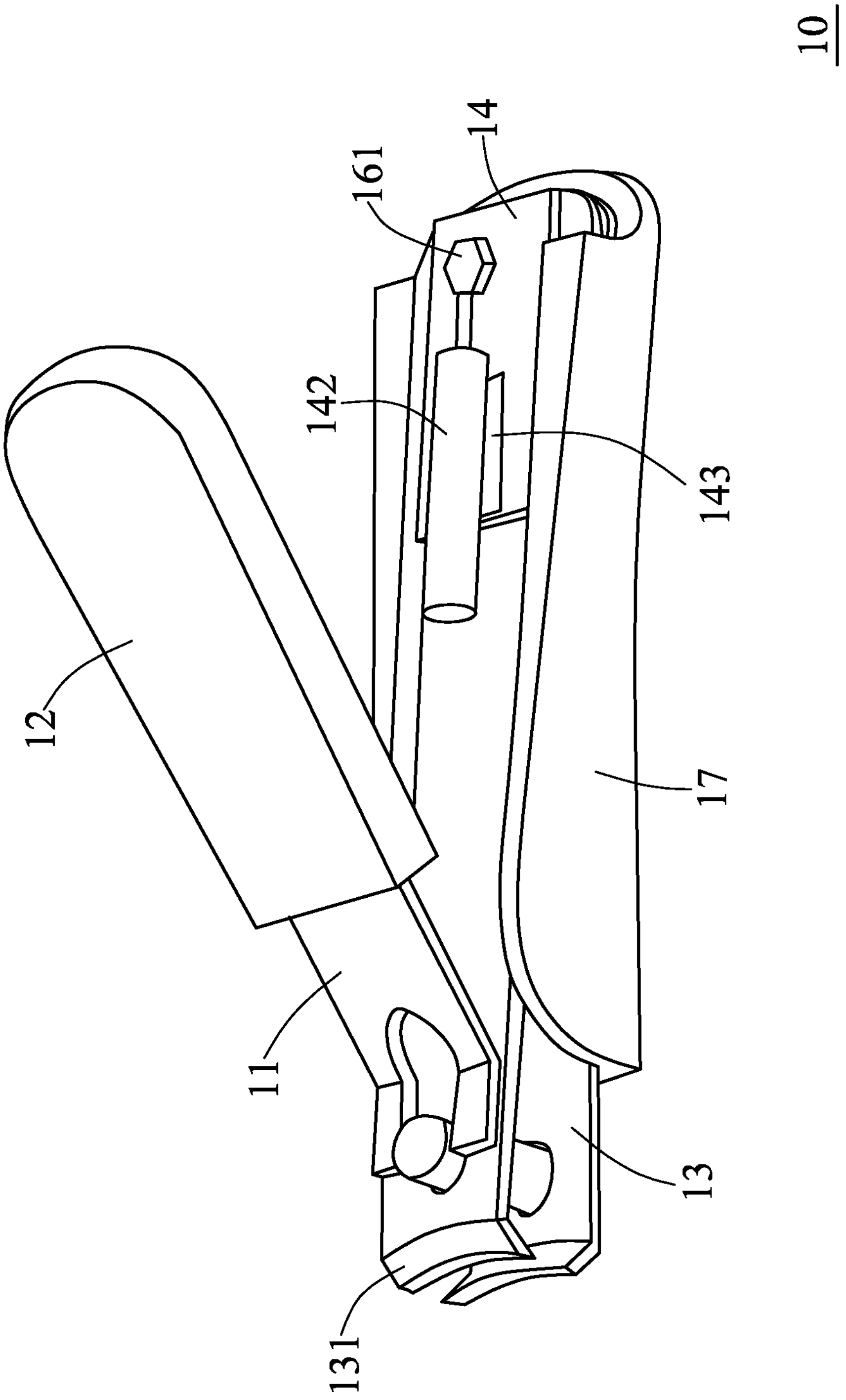
FIG. 1A illustrates a perspective view of the nail clipper device 10 in this embodiment.
Figure 1B:
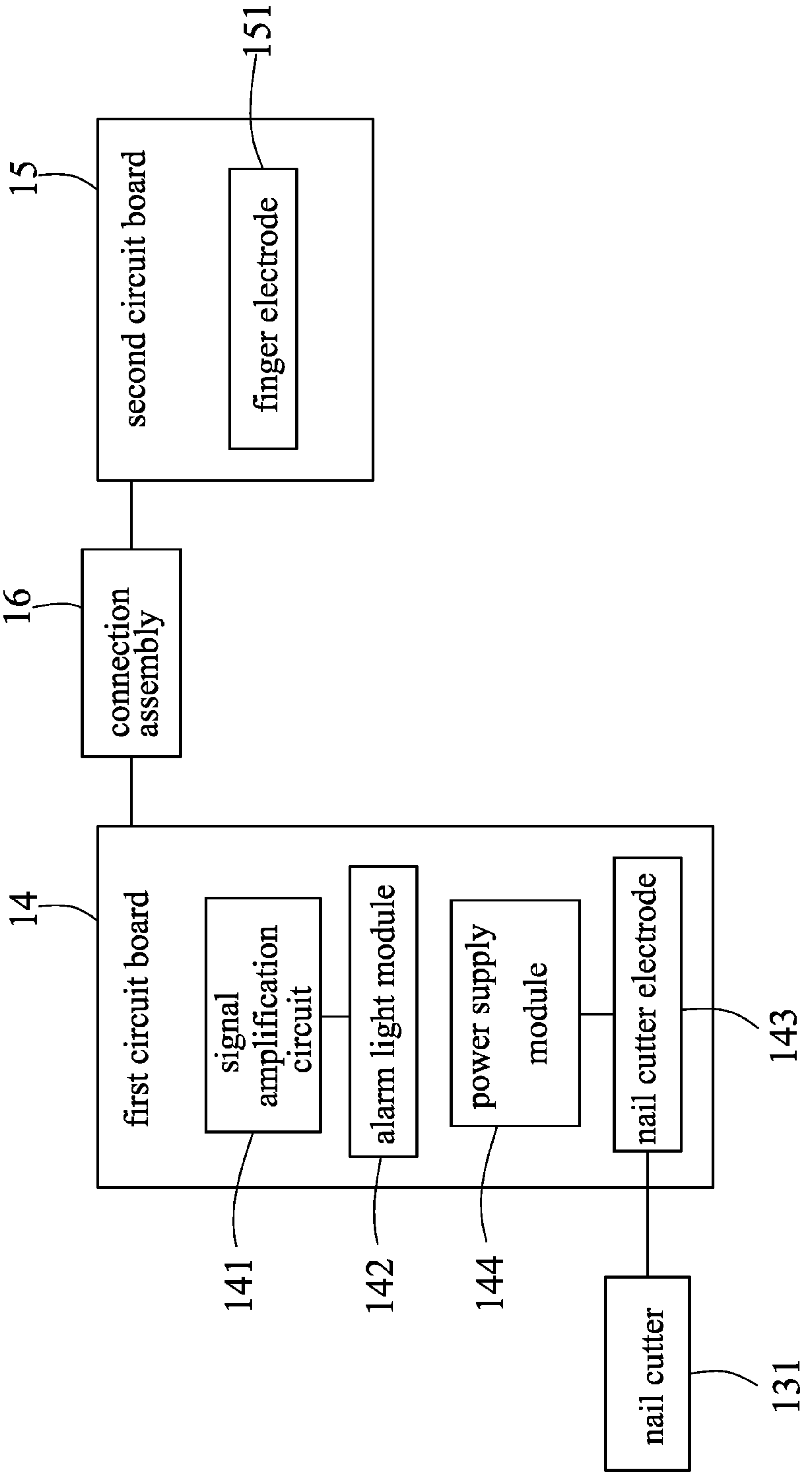
FIG. 1B illustrates a schematic diagram of the first circuit board 14 connected to the second circuit board 15.

Refer to FIG. 1A and FIG. 1B, where FIG. 1A illustrates a perspective view of the nail clipper device 10 in this embodiment, and FIG. 1B illustrates a schematic diagram of the first circuit board 14 connected to the second circuit board 15. The nail clipper device 10 includes a lever 11, a lever cover 12, a main body 13, a first circuit board 14, a second circuit board 15, a connection assembly 16, and a nail cutter shell 17. The main body 13 is connected to one end of the lever 11 and includes a nail cutter 131. The lever 11 and the main body 13 are made of conductive metal materials, such as carbon steel or stainless steel, while the lever cover 12 and nail cutter shell 17 are made of non-conductive plastic materials, produced using 3D printing methods, functioning as electrical insulators.

Furthermore, the lever cover 12 is fitted over the other end of the lever 11, and the nail cutter shell 17 is fitted over the main body 13, covering most of its bottom surface, and features a finger reserved hole 17H.

Additionally, the first circuit board 14 is positioned above the rear of the main body 13 and includes a signal amplification circuit 141, an alarm light module 142, a nail cutter electrode 143, and a power supply module 144. The alarm light module 142 is electrically connected to the signal amplification circuit 141 and, for example, is a light-emitting diode (LED), while the nail cutter electrode 143 is electrically connected to the nail cutter 131. Specifically, the nail cutter electrode 143 is electrically connected to the nail cutter 131 through the main body 13.

Figure 2:
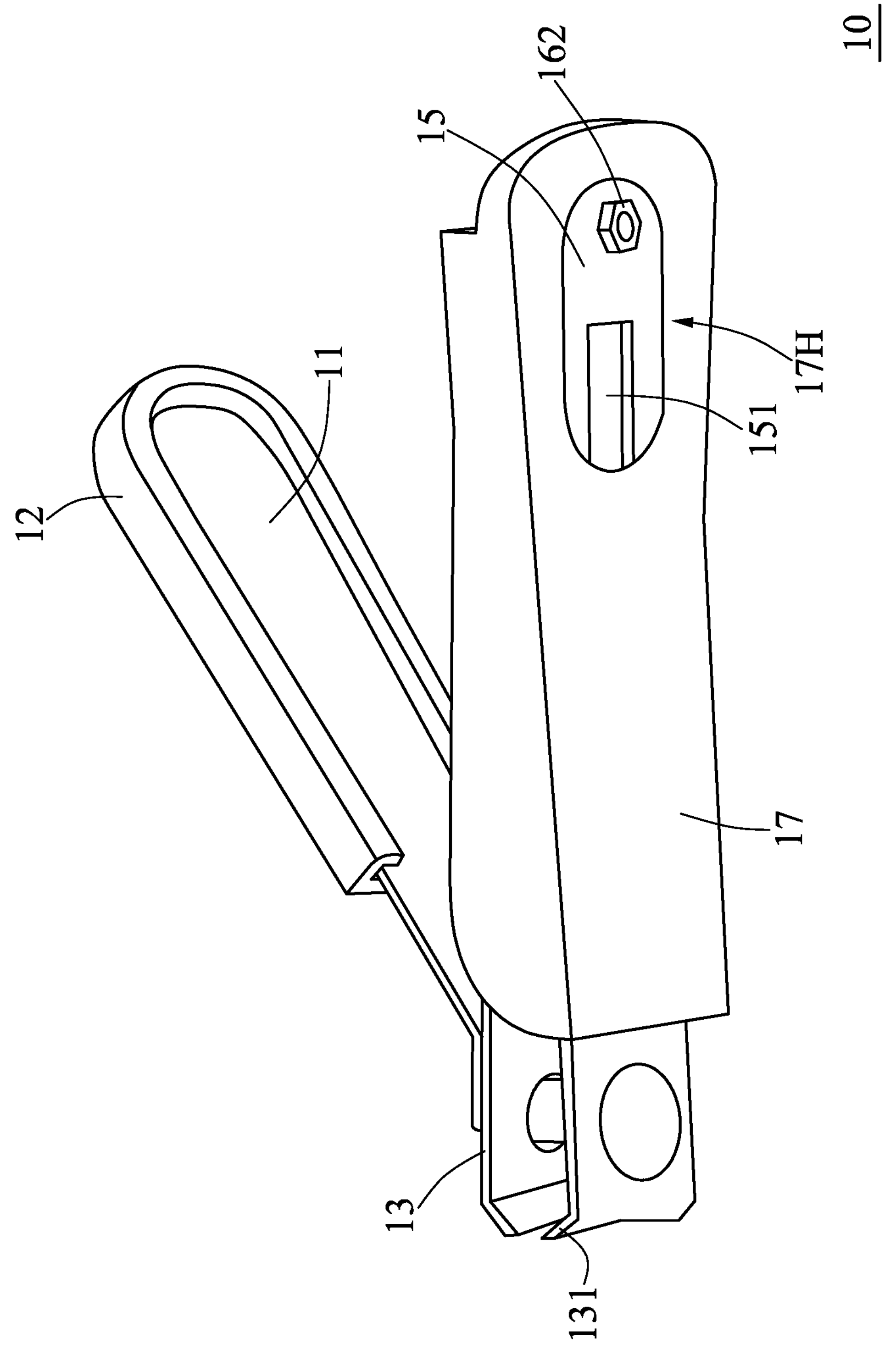
FIG. 2 illustrates a perspective view of the nail clipper device 10 from another angle.
Figure 3:
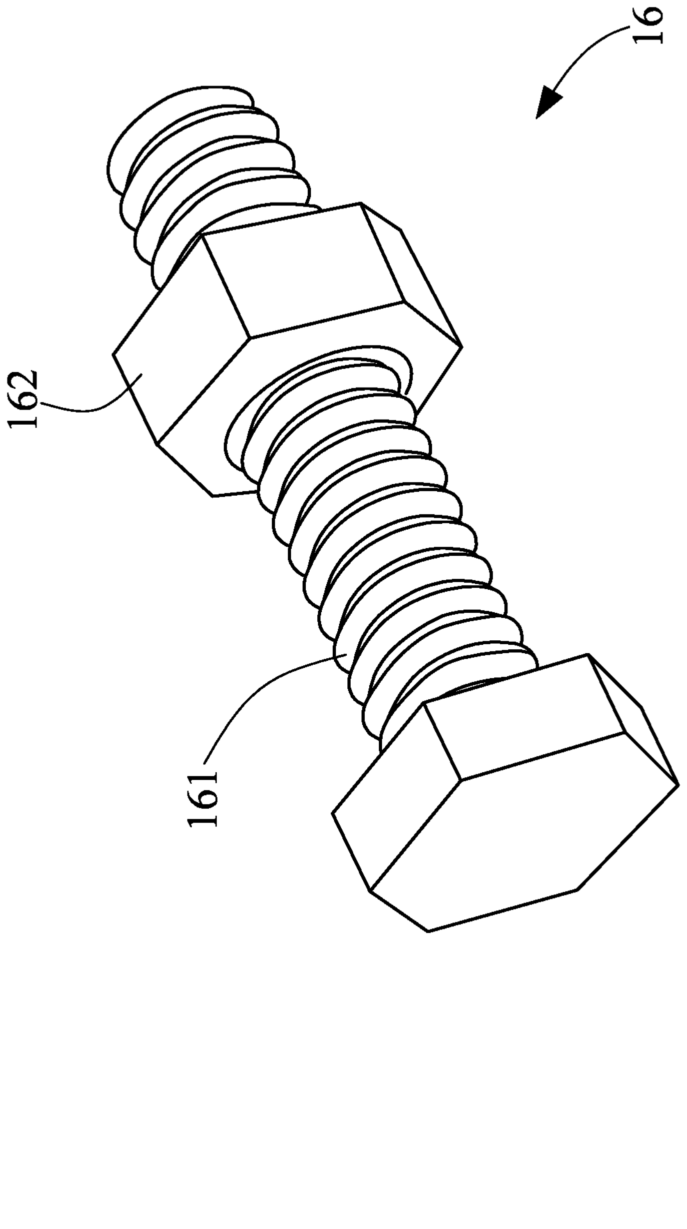
FIG. 3 illustrates a perspective view of the connection assembly 16.

Refer to FIG. 1B, FIG. 2, and FIG. 3, where FIG. 2 illustrates a perspective view of the nail clipper device 10 from another angle, and FIG. 3 illustrates a perspective view of the connection assembly 16. The second circuit board 15 is positioned below the rear of the main body 13, and the connection assembly 16 electrically connects the first circuit board 14 to the second circuit board 15. Specifically, the connection assembly 16 includes a screw 161 and a nut 162, with the nut 162 corresponding to the screw 161. The first and second circuit boards 14, 15 are fixed and connected through the screw 161 and nut 162. In this embodiment, both the screw 161 and nut 162 are made of a conductive material, such as carbon steel, stainless steel, or copper.

Furthermore, the second circuit board 15 includes a finger electrode 151, which is electrically connected to the signal amplification circuit 141. Specifically, the finger electrode 151 of the second circuit board 15 is electrically connected to the signal amplification circuit 141 in the first circuit board 14 via the connection assembly 16.

The power supply module 144 may be a lithium battery, an alkaline battery, or a silver oxide battery. In this embodiment, one electrode of the power supply module 144 is connected to the nail cutter electrode 143, and another electrode is connected to the finger electrode 151. For instance, the positive electrode of the power supply module

144 is connected to the nail cutter electrode 143, while its negative electrode is similarly electrically connected to the finger electrode 151 of the second circuit board 15 through the connection assembly 16.

Figure 4:
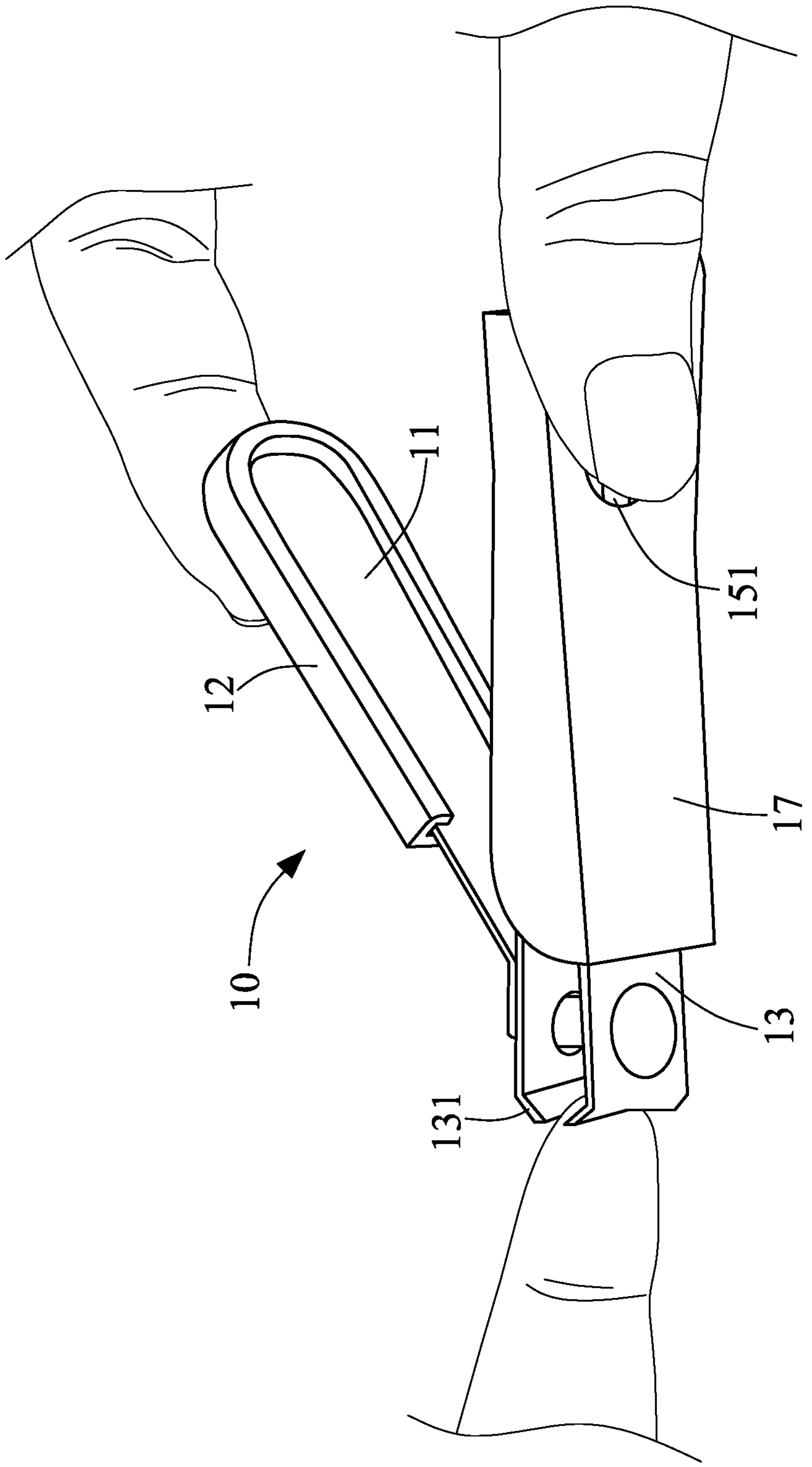
FIG. 4 illustrates a diagram showing the use of the nail clipper device 10 for clipping nails.

Additionally, refer to FIG. 2 and FIG. 4, where FIG. 4 illustrates a diagram showing the use of the nail clipper device 10 for clipping nails. The position of the finger reserved hole 17H in the nail cutter shell 17 corresponds to the position of the finger electrode 151. Thus, a human hand's finger can directly contact the finger electrode 151 through the reserved hole 17H.

In this embodiment, the power supply module 144 applies voltage to the nail cutter 131 itself through the nail cutter electrode 143. Subsequently, since human skin is a good conductor of electricity, when the nail flesh of one hand touches the nail cutter 131 and a finger of the other hand touches the finger electrode 151, a small electrical current is applied to the skin by the power supply module 144 via the nail cutter 131. This small current then flows through the body and the main body 13, forming a circuit.

Next, this small current is amplified by the signal amplification circuit 141 into a larger output current, which is then transmitted to the alarm light module 142, causing the alarm light module 142 to illuminate. This illumination serves as a reminder to the user that the nail cutter 131 has come into contact with the nail flesh, effectively preventing accidental injuries to the nail flesh or overly deep trimming.

Conversely, if the nail cutter 131 contacts the nail of a finger, since the conductivity of the nail is much lower than that of the nail flesh, a circuit cannot be formed through the body and the main body 13, and thus the alarm light module 142 will not illuminate.

In summary, the nail clipper device 10 of this invention effectively prevents accidental injuries to the nail flesh during nail clipping.

Although the invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

The invention claimed is:

1. A nail clipper device comprising: a lever; a lever cover fitted over the lever; a main body connected to the lever, the main body includes a nail cutter; a first circuit board positioned on one side of a rear of the main body, the first circuit board comprising: a signal amplification circuit, an alarm light module electrically connected to the signal amplification circuit, and a nail cutter electrode electrically connected to the nail cutter; a second circuit board positioned on another side of the rear of the main body, the second circuit board comprising: a finger electrode; a connection assembly connecting the first circuit board, the rear of the main body, and the second circuit board so that the finger electrode is electrically connected with the signal amplification circuit; and a nail cutter shell fitted over the main body, the nail cutter shell having a finger reserved hole positioned adjacent to the finger electrode.

2. The nail clipper device of claim 1, wherein the first circuit board further comprises a power supply module and one electrode of the power supply module is connected to the nail cutter electrode and another electrode of the power supply module is connected to the finger electrode.

3. The nail clipper device of claim 2, wherein the power supply module is a lithium battery, an alkaline battery, or a silver oxide battery.

4. The nail clipper device of claim 1, wherein the connection assembly comprises: a screw and a nut on the screw and wherein the screw and the nut are made of a conductive material.

5. The nail clipper device of claim 1, wherein the alarm light module is a light-emitting diode (LED).

* * * * *